(12) United States Patent
Backhouse et al.

(10) Patent No.: US 7,401,325 B2
(45) Date of Patent: Jul. 15, 2008

(54) METHOD AND APPARATUS FOR A CONFIGURABLE JAVA SERVER PAGES PROCESSING FRAMEWORK

(75) Inventors: Richard Andrew Backhouse, Apex, NC (US); Scott Dilworth Johnson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/701,954

(22) Filed: Nov. 5, 2003

(65) Prior Publication Data

US 2005/0097522 A1    May 5, 2005

(51) Int. Cl.
*G06F 9/45* (2006.01)
*G06F 15/00* (2006.01)

(52) U.S. Cl. .................. 717/136; 717/121; 715/513
(58) Field of Classification Search ......... 717/114–118, 717/136
See application file for complete search history.

(56) References Cited

U.S. PATENT DOCUMENTS

| | | | |
|---|---|---|---|
| 6,195,791 B1 | 2/2001 | Carlson et al. ............... 717/1 |
| 6,249,905 B1 | 6/2001 | Yoshida et al. ............... 717/1 |
| 6,308,314 B1 | 10/2001 | Carlson et al. ............... 717/1 |
| 6,381,743 B1 | 4/2002 | Mutschler, III ............. 717/104 |
| 6,434,739 B1 | 8/2002 | Branson et al. ............. 717/108 |
| 6,654,949 B1 * | 11/2003 | Fraenkel et al. ............. 717/130 |
| 6,981,212 B1 * | 12/2005 | Claussen et al. ............ 715/513 |
| 7,000,185 B1 * | 2/2006 | Murren et al. .............. 715/536 |
| 7,072,934 B2 * | 7/2006 | Helgeson et al. ............ 709/203 |
| 2003/0093717 A1 | 5/2003 | Mason ........................ 714/38 |
| 2003/0135842 A1 | 7/2003 | Frey et al. .................. 717/121 |

OTHER PUBLICATIONS

Sabbaghian et al., "Product Development Process Capture and Display Using Web-Based Technologies", SMC'98 Conference Proceedings. 1998 IEEE International Conference on Systems, Man, and Cybernetics (Cat. No. 98CH36218), Part vol. 3, pp. 2664-2669.

* cited by examiner

*Primary Examiner*—Tuan Q. Dam
*Assistant Examiner*—Isaac T Tecklu
(74) *Attorney, Agent, or Firm*—Duke W. Yee; Martin J. McKinley; Brandon G. Williams (57) ABSTRACT

A method, apparatus, and computer instructions for a configurable JAVASERVER pages processing framework to process JAVASERVER pages (JSP). A JSP document or page is translated into a document object model (DOM) object that encapsulates elements of the JSP. The syntax of the JSP is validated by a JSP translator with built-in classes and errors are returned if necessary. A JSP visitor configuration file, which defines user configured classes and sequence of execution, is used by the JSP translator to invoke methods of user-defined classes in the order specified by the user to process or visit elements of the DOM object. Result of user-defined class processing may be passed from one class to another within the set.

9 Claims, 9 Drawing Sheets

JSP VISITOR
CONFIGURATION
SCHEMA
602

```
<xsd:schema xmlns:xsd="http://www.w3.org/2001/XMLSchema">

<xsd:annotation>
    <xsd:documentation xml:lang="en">
    Jsp Visitor Collection schema.
    </xsd:documentation>
  </xsd:annotation>

<xsd:element name="jsp-visitor-configuration">
    <xsd:complexType>               604
      <xsd:sequence>                /
        <xsd:element ref="jsp-visitor-definition" minOccurs="0" maxOccurs="unbounded"/>
      </xsd:sequence>               606
      <xsd:sequence>                /
        <xsd:element ref="jsp-visitor-collection" minOccurs="0" maxOccurs="unbounded"/>
      </xsd:sequence>
    </xsd:complexType>
  </xsd:element>

<xsd:element name="jsp-visitor-definition" type="jsp-visitor-definitionType"/>

<xsd:complexType name="jsp-visitor-definitionType">
    <xsd:sequence>              608
      <xsd:element name="class-name" type="xsd:string"/>
      <xsd:element name="result-type" type="xsd:string"/>
    </xsd:sequence>             610
    <xsd:attribute name="id" type="xsd:string"/>
  </xsd:complexType>            612

<xsd:element name="jsp-visitor-collection" type="jsp-visitor-collectionType"/>

<xsd:complexType name="jsp-visitor-collectionType">
    <xsd:sequence>
      <xsd:element ref="jsp-visitor" minOccurs="0" maxOccurs="unbounded"/>
    </xsd:sequence>
    <xsd:attribute name="id" type="xsd:string"/>  620
  </xsd:complexType>

<xsd:element name="jsp-visitor" type="jsp-visitorType"/>

<xsd:complexType name="jsp-visitorType">
    <xsd:attribute name="id" type="xsd:string"/>    614
    <xsd:attribute name="order" type="xsd:int"/>    616
    <xsd:attribute name="visits" type="xsd:int"/>   618
  </xsd:complexType>
</xsd:schema>
```

*FIG. 6*

```xml
<?xml version="1.0" encoding-"UTF-8"?>
<jsp-visitor-configuration xmlns:xsi="http://www.w3.org/2001/XMLSchema-instance"
            xsi:schemaLocation="http://www.ibm.com/xml/ns/JspVisitorConfiguration.xsd">
    <jsp-visitor-definition id="JspValidate">                    ──── 704
        <class-name>com.ibm.ws.jsp.translator.visitor.validator.ValidateJspVisitor</class-name>  ── 718
        <result-type>com.ibm.ws.jsp.translator.visitor.validator.ValidateJspResult</result-type> ── 720
    </jsp-visitor-definition>
    <jsp-visitor-definition id="JspGenerate">   ── 706
        <class-name>com.ibm.ws.jsp.translator.visitor.generator.GenerateJspVisitor</class-name>
        <result-type>com.ibm.ws.jsp.translator.visitor.generator.GenerateJspResult</result-type>
    </jsp-visitor-definition>
    <jsp-visitor-definition id="TagFileDependencyCheck">  ── 708
        <class-name>com.ibm.ws.jsp.translator.visitor.tagfiledep.TagFileDependencyVisitor</class-name>
        <result-type>com.ibm.ws.jsp.translator.visitor.tagfiledep.TagFileDependencyResult</result-type>
    </jsp-visitor-definition>
    <jsp-visitor-definition id="TagFileScan">  ── 710
    <class-name>com.ibm.ws.jsp.translator.visitor.tagfilescan.TagFileScanVisitor</class-name>
    <result-type>com.ibm.ws.jsp.translator.visitor.tagfilescan.TagFileScanResult</result-type>
    </jsp-visitor-definition>
    <jsp-visitor-definition id="TagFileValidate">  ── 712
        <class-name>com.ibm.ws.jsp.translator.visitor.validator.ValidateTagFileVisitor</class-name>
        <result-type>com.ibm.ws.jsp.translator.visitor.validator.ValidateTagFileResult</result-type>
    </jsp-visitor-definition>
    <jsp-visitor-definition id="TagFileGenerate">  ── 714
        <class-name>com.ibm.ws.jsp.translator.visitor.generator.GenerateTagFileVisitor</class-name>
        <result-type>com.ibm.ws.jsp.translator.visitor.generator.GenerateTagFileResult</result-type>
    </jsp-visitor-definition>
    <jsp-visitor-definition id="Smap">  ── 716
        <class-name>com.ibm.ws.jsp.translator.visitor.smap.SmapVisitor</class-name>
        <result-type>com.ibm.ws.jsp.translator.visitor.smap.SmapVisitorResult</result-type>
    </jsp-visitor-definition>

<jsp-visitor-collection id="JspTranslation">  ── 722
        <jsp-visitor id="TagFileDependencyCheck" order="1" visits="1"/>  ── 732
        <jsp-visitor id="JspValidate" order="2" visits="1"/>  ── 734
        <jsp-visitor id="JspGenerate" order="3" visits="7"/>  ── 736
    </jsp-visitor-collection>
    <jsp-visitor-collection id="DebugJspTranslation">  ── 724
        <jsp-visitor id="TagFileDependencyCheck" order="1" visits="1"/>
        <jsp-visitor id="JspValidate" order="2" visits="1"/>
        <jsp-visitor id="JspGenerate" order="3" visits="7"/>
        <jsp-visitor id="Smap" order="4" visits="1"/>
    </jsp-visitor-collection>
    <jsp-visitor-collection id="TagFileTranslation">  ── 726
        <jsp-visitor id="TagFileValidate" order="1" visits="1"/>
        <jsp-visitor id="TagFileGenerate" order="2" visits="7"/>
    </jsp-visitor-collection>
    <jsp-visitor-collection id="DebugTagFileTranslation">  ── 728
        <jsp-visitor id="TagFileValidate" order="1" visits="1"/>
        <jsp-visitor id="TagFileGenerate" order="2" visits="7"/>
        <jsp-visitor id="Smap" order="3" visits="1"/>
    </jsp-visitor-collection>
    <jsp-visitor-collection id="TagFileDependency">  ── 730
        <jsp-visitor id="TagFileDependencyCheck" order="1" visits="1"/>
    </jsp-visitor-collection>
</jsp-visitor-configuration>
```

702
JSP VISITOR
CONFIGURATION
FILE

```
                                                    ValidateJSPVisitor
                                                         PROGRAM
                                                           1002
                    1004           1006                    /
                     \              /
       protected void visitJspOutputStart (Element jspElement) throws JspCoreException {
           if (!jspConfiguration.isXml()) {
               throw new JspTranslationException(jspElement, "jsp.error.jspoutput.xml.only");
           }
1008 ~ validateAttributes(jspElement, outputAttrNames);  /—1010
           if (jspElement.hasChildNodes()) {
               throw new JspTranslationException(jspElement, "jsp.error.output.has.body");
           }
           Attr docTypeRootElement = jspElement.getAttributeNode("doctype-root-element");
           Attr docTypeSystem = jspElement.getAttributeNode("doctype-system");
           Attr docTypePublic = jspElement.getAttributeNode("doctype-public");

1014 ~ if (doctypeSystem == null) {
           if (docTypeRootElement != null) {
               throw new JspTranslationException(jspElement, "jsp.error.no.doctype-system.attr");
           }
1016 /— if (docTypePublic !=null) {
               throw new JspTranslationException(jspElement, "jsp.error.no.doctype-system.attr");
           }
       }
       else {
1012 /— if (docTypeRootElement == null) {
               throw new JspTranslationException(jspElement, "jsp.error.no.doctype-root-element.attr"
           }
       }
   }
```

*FIG. 10A*

ValidateTagFileVisitor
PROGRAM
1020

```
                    1022                    1024
                       \                    /
    protected void visitJspDoBodyStart (Element jspElement) throws JspCoreException {
1026 ─── List specifiedStandardActionAttrs = getAttributeList(jspElement);
1030 ─── validateAttributes(specifiedStandardActionAttrs, jspElement, doBodyAttrNames); ─── 1028
        validateEmptyBody(jspElement);
        Attr varAttr = jspElement.getAttributeNode("var");
        Attr varReaderAttr = jspElement.getAttributeNode("varReader");
        if (varAttr != null && varReaderAttr != null) {
            throw new JspTranslationException(jspElement, "jsp.error.TagFile.dobody.var_varreader");
        } if (jspElement.hasAttribute("scope")) {
            if (jspElement.hasAttribute("var") == false &&
    jspElement.hasAttribute("varReader") == false) {
                throw new JspTranslationException(jspElement,
    "jsp.error.tagfile.dobody.scope_var_varreader");
            }
        }
1032 ─── Attr scopeAttr = jspElement.getAttributeNode("scope");

if (scopeAttr != null) {
            boolean valid = false;
1034 ─── if (scopeAttr.getValue().equals("page")) {
                valid = true;
            }
1036 ─── else if (scopeAttr.getValue().equals("request")) {
                valid = true;
            }
1038 ─── else if (scopeAttr.getValue().equals("session")) {
                valid = true;
            }
1040 ─── else if (scopeAttr.getValue().equals("application")) {
                valid = true;
            }
            if (valid == false) {
                throw new JspTranslationException(jspElement, "jsp.error.tagfile.dobody.scope_invalid")
            }
        }
    }
```

METHOD AND APPARATUS FOR A CONFIGURABLE JAVA SERVER PAGES PROCESSING FRAMEWORK

BACKGROUND OF THE INVENTION

1. Technical Field

The present invention relates generally to an improved data processing system and, in particular, to a method and system for processing JAVASERVER pages. Still more particularly, the present invention relates to a method, apparatus, and computer instructions for a configurable JAVASERVER pages processing framework to process JAVASERVER pages.

2. Description of Related Art

With increasing use of the Internet, customer demands on information provided by Web pages have become more dynamic. Web developers are not only required to generate presentation of Web pages, but also business logic required to generate dynamic contents, such as, for example, a name and an email address of a user from a server. The demand for a flexible method to build dynamic Web pages contributes to the development of JAVASERVER pages, a technology available from Sun Microsystems, Inc.

JAVASERVER pages (JSP) provide Web developers an open, freely available specification that provides the advantages, such as, platform-independence, use of the JAVA programming language, and compatibility with a variety of technologies, such as Web servers, Web browsers, and application servers. A JSP page is a Web page with containing a markup language and additional JAVA code. Examples of markup languages are hypertext markup language (HTML), extensible markup language (XML) and wireless markup language (WML). The JAVA code is embedded within tags. When the JSP page is called, this page is compiled by the JSP engine into a JAVA servlet, which is handled by a servlet engine. The servlet engine loads the servlet class using a class loader and executes the class to create dynamic HTML to be sent to the browser. The next time the same JSP page is called, the JSP engine executes the already-loaded servlet.

JSP allows Web developers to separate user interface from content generation through the use of tags. Tags may be in the form of extensible markup language (XML), which encapsulates the logic that generates the content of the page. These tags allow reusable components to be encapsulated, to make building of Web pages easier.

However, due to increasing complexity of the JSP source file and evolving JSP specification, the use of JSP technology described above has become more costly. The maintenance cost of JSP processors, such as a JSP engine inside an Application server or an integrated development environment (IDE) that authors and tests JSP pages, has also increased. In addition, all JSP pages are required to be validated syntactically for correctness before further processing can be done. With different JSP processors, different requirements are present. For example, an IDE tool may need to present a graphical view of JSP page for editing and a JSP engine may need to generate a JAVA source file from the JSP page.

Therefore, it would be advantageous to have an improved method, apparatus, and computer instructions for a configurable JSP processing framework that supports new and different requirements for JSP processing, has detailed knowledge of the JSP specification, performs syntax validation, and customarily executes JSP processing tasks.

SUMMARY OF THE INVENTION

The present invention provides a method, apparatus, and computer instructions for a configurable JAVASERVER pages (JSP) processing framework to process JSP. In a preferred embodiment, the processing framework of present invention provides a JSP translator that translates a JSP document or page into a document object model (DOM) object. A JSP processor, such as a service or tool provider, may use the JSP translator to configure custom classes, known as "visitor" classes, to be invoked in a certain sequence, so that custom functions may be performed on the DOM object to return custom results. The configuration of custom classes is stored in XML format using a JSP visitor configuration file. The processing framework of present invention also includes built-in classes and a JSP engine that validates the syntax of the JSP and return any errors if necessary.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram of an example schema used in the present invention for the JSP configuration file in accordance with a preferred embodiment of the present invention;

FIG. 7 is a diagram illustrating an example JSP visitor configuration file used in the present invention in accordance with a preferred embodiment of the present invention;

DETAILED DESCRIPTION OF THE PREFERRED EMBODIMENT

Figure 1:
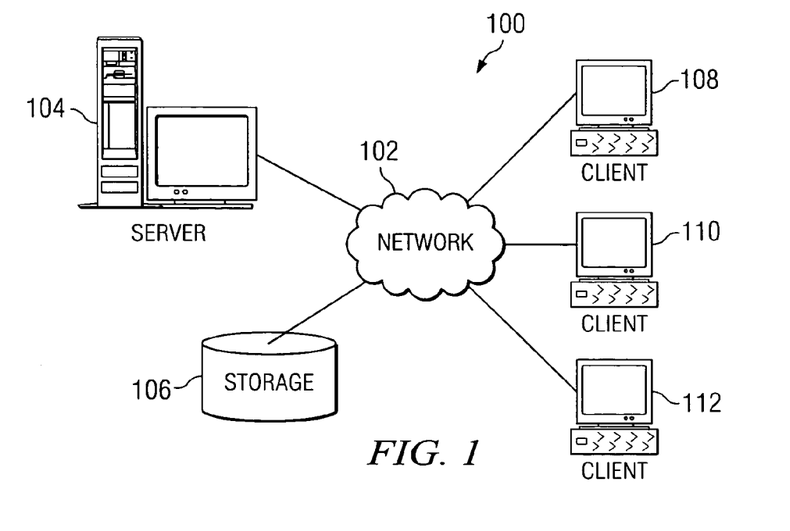
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
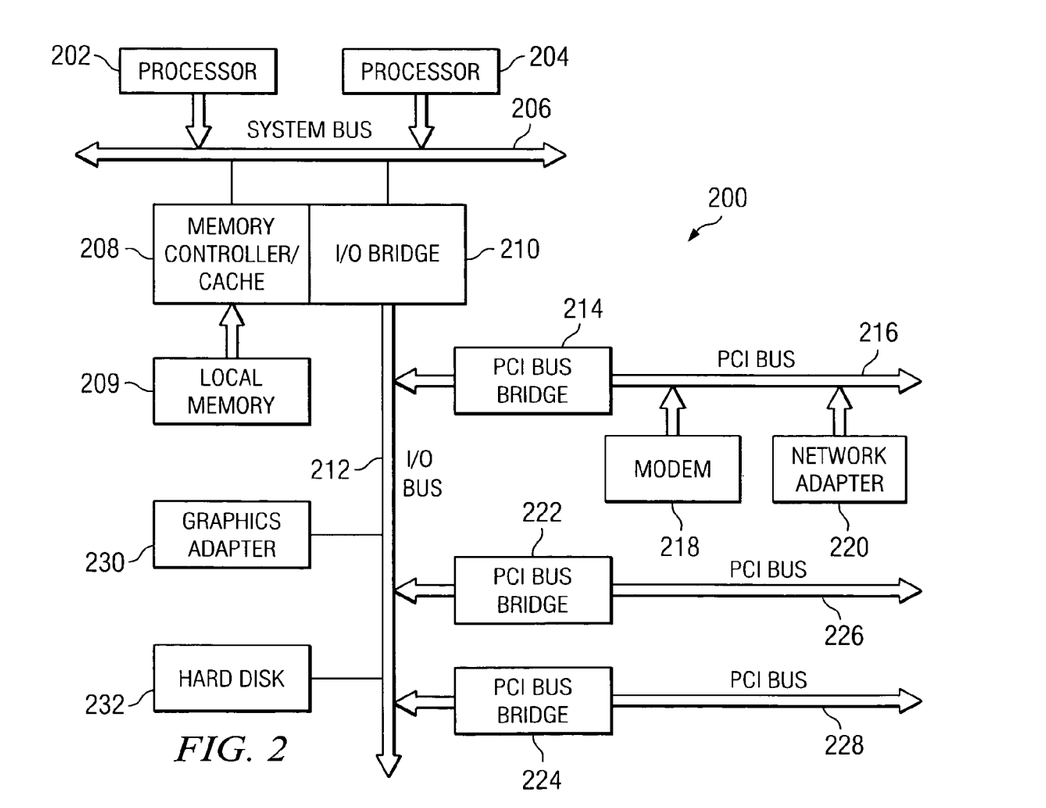
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
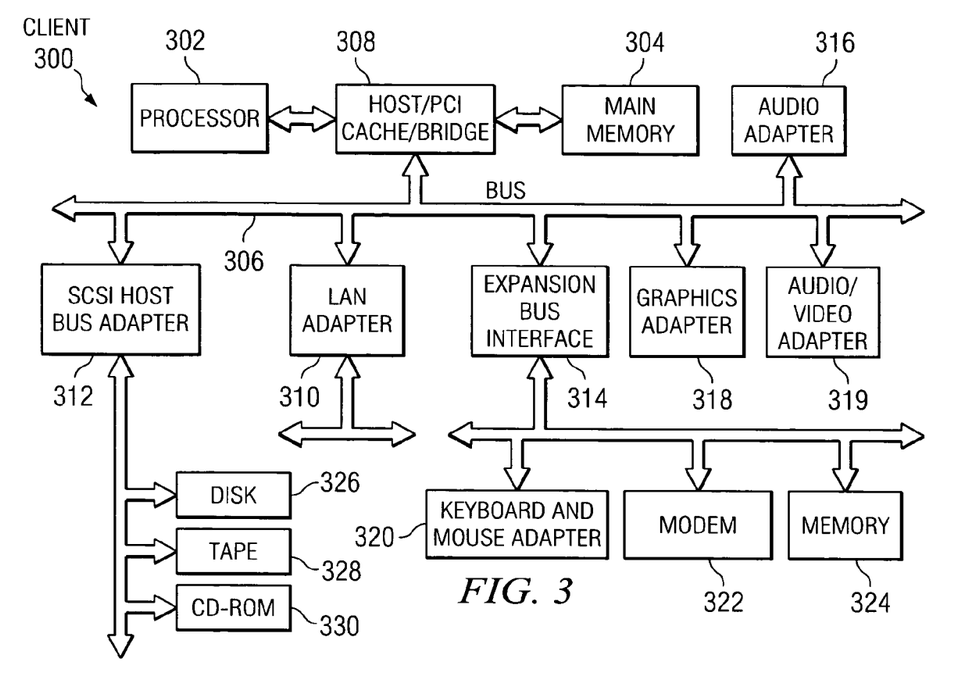
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as a JAVA may run in conjunction with the operating system and provide calls to the operating system from JAVA programs or applications executing on data processing system 300. "JAVA" and "JAVASERVER" are trademarks of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for a configurable JAVASERVER pages (JSP) processing framework to process JSP. In a preferred embodiment, the processing framework of the present invention is configurable to invoke user-supplied classes that meet specific requirements of a JSP processor in a user-defined sequence, in order to gather information about a JSP document or page. The user-supplied classes are known as "visitor" classes.

When a JSP processor, such as a service or tool provider, wants to gather information from a JSP document or page, the JSP processor provides "visitor" classes to perform custom functions to process the JSP document. The processing framework of the present inventions allows the JSP processor to define necessary "visitor" classes to be invoked and the order in which the "visitor" classes are invoked in an XML format file. This file also is known as JSP visitor configuration file.

Prior to processing a JSP document or page, the processing framework translates a JSP document or page using a document object model (DOM) generator into a DOM object and validates the syntax of the JSP document or page by invoking built-in classes of the processing framework. If any error occurs as a result of validation, the error is returned to the JSP processor. If no error occurs, the processing framework instantiates a set of "visitor" classes according to the order defined in the JSP visitor configuration file to process the DOM object.

The processing framework processes the DOM object by visiting each node or element of the object and invokes methods in the "visitor" classes to process each node or element. For example, when a JSP include action element is encountered, the "visitJspInclude" method in "JspAnalyzerVisitor" class is invoked to increment the count value of "JspInclude-Count". The result of one "visitor" class's processing may be passed to the next "visitor" class in the processing sequence using a hash map, which is a complex data object that contains a set of keys and values. The use of a hash map allows one "visitor" class to store data specific to its needs or the needs of other "visitor" classes that are further down in the processing sequence.

Figure 4:
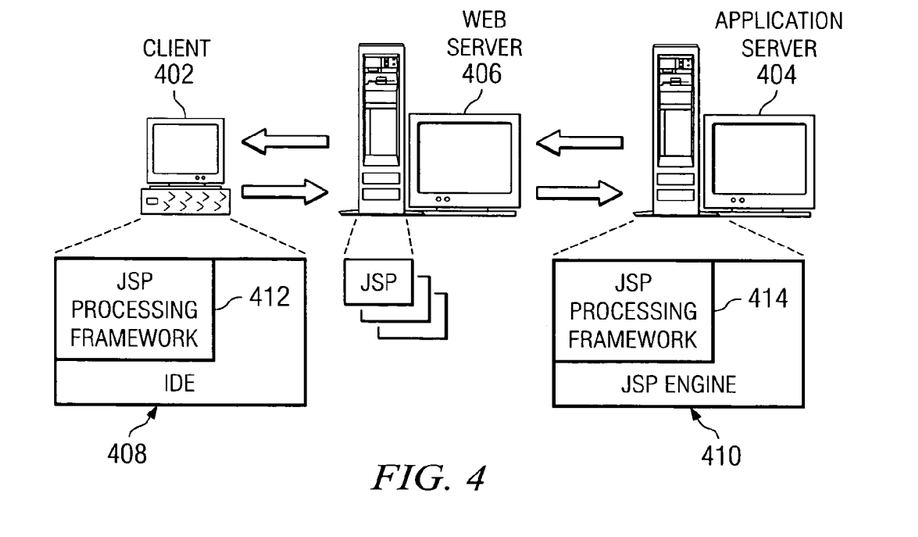
FIG. 4 is a diagram illustrating processing framework of the present invention in a data processing system in accordance with a preferred embodiment of the present invention.

Turning next to FIG. 4, a diagram illustrating processing framework in a data processing system is depicted in accordance with a preferred embodiment of the present invention. As depicted in FIG. 4, the processing framework of the present invention may be implemented in different types of data processing systems, such as client 402 and application server 404. Client 402 may be implemented using a data processing system, such as data processing system 300 in FIG. 3. Application server 404 may be implemented using a data processing system, such as data processing system 200 in FIG. 2.

A Web developer may run a JSP processor, such as integrated development environment (IDE) 408, on client 402 to author or test JSP pages. A Web developer may also run another JSP processor, such as JSP engine 410, to generate a JAVA source file from the JSP page. Currently, JAVASERVER pages (JSP) are stored in a Web server 406. When a JSP processor, such as IDE 408 or JSP engine 410, requests a JSP page to be processed, Web server, such as Web server 406 responds by sending the desired JSP page to corresponding processing framework 412 or 414. Then, processing framework 412 or 414 translates the JSP page into a DOM object using a DOM generator and validates the syntax of the JSP page by invoking built-in classes, such as "ValidateJspVisitor" class. If the syntax is correct, processing framework 412 invokes custom "visitor" classes to present a graphical view of the JSP page for editing, and processing framework 414 invokes custom "visitor" classes to generate JAVA source file from the JSP page. Thus, through the use of processing framework of the present invention, each JSP processor may perform common functions, such as validation of the JSP page, as well as custom functions, such as generating JAVA source file, by invoking custom "visitor" classes.

The processing framework in the illustrative examples include five primary components: a document object model (DOM) generator, a JSP configuration manager, a JSP translator factory, a JSP visitor configuration file, and a JSP translator.

The DOM generator creates a DOM object from a JSP document or page. A JSP document is a JSP page or tag file written in XML syntax. A JSP page in the examples is a JSP page or tag file written in a classic syntax. Classic syntax is JSP syntax used primarily before version 1.2 of the JSP specification. In order to generate a DOM object from a JSP page or tag file in classic syntax, the DOM generator has detailed knowledge of classic JSP syntax. The resulting object generated by the DOM generator is used for syntax validation.

Figure 5:
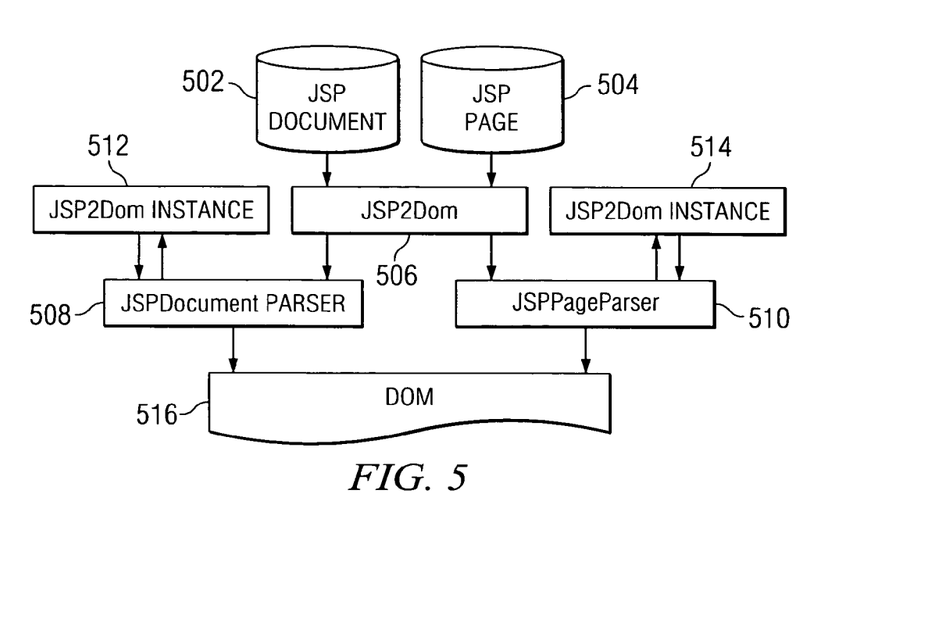
FIG. 5 is a diagram illustrating components of translating a JSP document or page into a DOM object using a DOM generator in accordance with a preferred embodiment of the present invention.

Turning next to FIG. 5, a diagram illustrating components of translating a JSP document or page into a DOM object using a DOM generator is depicted in accordance with a preferred embodiment of the present invention. As depicted in FIG. 5, JSP document 502 or JSP page 504 is first located by JSP2Dom 506. JSP2Dom 506 is a class that translates a JSP document or page into a DOM object. In order to perform translation, JSP2Dom 506 first parses JSP document 502 or JSP page 504 by using JSPDocumentParser 508 or JSPPageParser 510, respectively. JSPDocumentParser 508 or JSPPageParser 510 reads JSP document 502 or JSP page 504 and parses JSP document 502 or page 504 into parent nodes of DOM object 516.

If a static include statement, meaning other JSP files are needed, is found within JSP document 502 or JSP page 504, JSPDocumentParser 508 or JSPPageParser 510 creates a new instance of JSP2Dom 512 and 514 for each included file. JSP2Dom instances 512 and 514 in turn translate the included JSP file into a new DOM object and insert new DOM nodes into DOM object 516 as child nodes. The included JSP file may be in a different format than its parent JSP file. For example, JSP document 502 may include a JSP page and JSP page 504 may include a JSP document.

The second primary component of the processing framework is the JSP configuration manager. The JSP configuration manager configures JSP via JSP property groups in web.xml file. A web.xml file is a XML file that defines settings of Web components, such as JAVA servlets and tag library descriptors (TLD). A JSP property group is a group of JSP pages with certain properties, such as page encoding, and expression language evaluation. A given property group applies to JSP that matches a URL pattern that is defined in the group. When a Web module is loaded, JSP property groups are also loaded from the web.xml file.

When a JSP processor such as JSP engine requests for a JSP page for translation, the JSP configuration manager matches the request URL to the pre-loaded property group and returns a JSPConfiguration object created from the property group(s) that apply to the specific JSP. The JSPConfiguration object is used during the translation phase of processing a JSP page to determine the kind of parsers and writer for parsing.

The third primary component is the JSP translator factory. The JSP translator factory is the entry point into the processing framework of the present invention. When a JSP processor request a JSP page or document to be processed, the JSP translator factory enables the processing framework to be configurable by using a configuration file called JSP visitor configuration file, which is the fourth primary component of the processing framework. The JSP visitor configurations file allows a collection of user-supplied "visitor" classes to be used for processing the JSP document or page in the processing sequence specified in the file. The JSP configuration file adheres to a schema.

Turning next to FIG. 6, a diagram of an example schema used in accordance with a preferred embodiment of the present invention for the JSP configuration file is depicted in accordance with the present invention. As depicted in FIG. 6, JSP visitor configuration schema 602 is an XML schema that includes two types of elements, jsp-visitor-definition 604 and jsp-visitor-collection 606. Jsp-visitor-definition 604 element identifies visitor class name 608 and result class 610. Visitor class name 608 processes the DOM object, and result class 610 returns the results of processing. Jsp-visitor-definition 604 element also identifies an id 612, which is the name of this definition, such as "JspValidate".

Jsp-visitor-collection 606 element identifies collection of one or more of the jsp-visitor-definitions 604. Each definition of the collection includes an id, such as id 614; an order, such as order 616; and visits, such as visits 618. Id 614 is the name of the definition, such as "JspValidate". Order 616 is the order of execution for the visitor definition within this collection. Visits 618 is the number of times the visitor definition should be executed to visit the DOM object.

The order of execution is important because one visitor may depend on results of a previous visitor. The number of visits by a visitor within a collection also is important because a visitor may have discrete phases of operation that needs to be called separately. For example, a JAVA code generation visitor has to generate seven discrete sections of a JAVA source file. Each section involves participation of different methods within the class that must be executed in a particular order. In addition, jsp-visitor-collection 606 element includes an Id, such as id 620. This Id is the name of a collection, such as "JspTranslation".

Turning now to FIG. 7, a diagram illustrating an example JSP visitor configuration file is depicted in accordance with a preferred embodiment of the present invention. As depicted in FIG. 7, JSP visitor configuration file 702 is a XML file that defines a set of visitor classes. JSP visitor configuration file 702 is a default configuration file of the processing framework in the illustrative examples, but a user may customize it to include user-supplied "visitor" classes. A number of jsp-visitor-definitions or "visitor" classes, such as JspValidate 704, JspGenerate 706, TagFileDependencyCheck 708, TagFileScan 710, TagFileValidate 712, TagFileGenerate 714, and Smap 716 are defined in this example. Within each definition, a class name and a result class is defined. For example, JspValidate includes a class name "com.ibm.ws.jsp.translator.visitor.validator.ValidateJspVisitor" 718 and a result class "com.ibm.ws.jsp.translator.visitor-.validator.ValidateJspResult" 720.

In addition, JSP visitor configuration file 702 includes a number of jsp-visitor-collections, such as, for example, JspTranslation 722, DebugJspTranslation 724, TagFileTranslation 726, DebugTagFileTranslation 728, and TagFileDependency 730. Within each collection, a number of definitions are defined with corresponding execution order and number of visits. For example, JspTranslation 722 includes TagFileDependencyCheck 732 to be executed first, followed by JspValidate 734 and JspGenerate 736, which is executed seven times in order to generate a JAVA source file. Thus, JSP visitor configuration file enables processing of the JSP document or page to be configurable, so that custom functions may be performed by the JSP processor to satisfy different requirements.

Once the JSP translator factory is initialized with a custom collection of "visitor" classes from the JSP visitor configuration file, the JSP translator factory creates an instance of the JSP translator with the name of the collection, the path of the JSP page or document, and a reference to the JSP configuration object returned from the JSP configuration manager. The JSP translator is the fifth primary component of the processing framework in the illustrative examples.

The JSP translator created by the factory processes the JSP document or page by first calling Jsp2Dom, as described above, to translate a JSP page or document into a DOM object. The JSP translator then invokes its processVisitors method to allow "visitor" classes in the collection to "visit" the DOM object as many times as and in the order specified in the JSP visitor configuration file, in order to operate on the DOM object.

Figure 8:
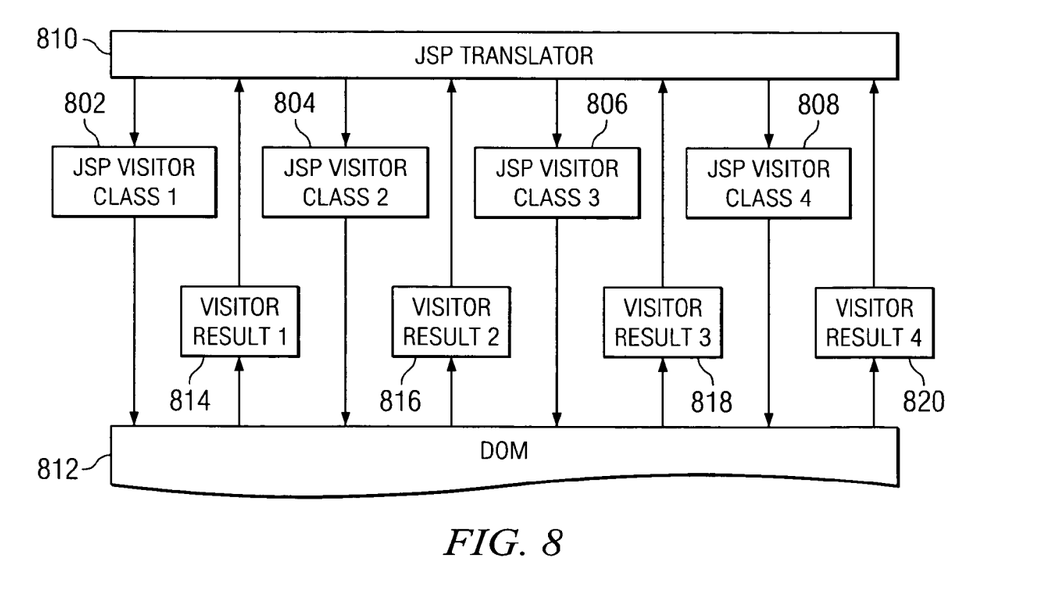
FIG. 8 is a diagram illustrating components used in processing DOM object using a collection of visitor classes in accordance with a preferred embodiment of the present invention.

Turning next to FIG. 8, a diagram illustrating components used in processing DOM object using a collection of visitor classes is depicted in accordance with a preferred embodiment of the present invention. As depicted in FIG. 8, in this example implementation, a collection includes four "visitor" classes in execution order: JSP visitor class 1 802, JSP visitor class 2 804, JSP visitor class 3 806, and JSP visitor class 4 808. Once a JSP translator, such as JSP translator 810, is created by the factory, JSP translator 810 calls JSP2Dom to parse a JSP document into DOM object 812.

JSP translator 810 invokes its processVisitors method, which calls JSP visitor class 1 802 as many times as defined in the JSP visitor configuration file to operate on the DOM object 812. For example, JSP visitor class 1 802 may be a "JspValidate" class executed one time to validate the syntax of the JSP.

The results of processing performed by JSP visitor class 1 802, represented by visitor result class 1 814, is returned to JSP translator 810. The name of visitor result class 1 814 is also defined in the JSP visitor configuration file. Results of each visit are stored in a hash map. A hash map is a complex data object that contains a set of keys and values. The hash map allows each visitor to store result data specific to its needs, or needs of other visitor classes further down the processing sequence.

For example, a visitor may store in the HashMap all the properties of a tag file that were discovered during validation. In this example, the hash map of visitor result class 1 814 may be passed to JSP visitor class 2 804, the hash map of visitor result class 2 816 may be passed to JSP visitor class 3 806, and the hash map of visitor result class 1 818 may be passed to JSP visitor class 2 808, etc. In the illustrative examples, the hash map is also called a resultMap, which is used to build up a set of visitor results that is added to when a visitor completes processing. When the resultMap is passed to the next visitor class in the processing sequence, the data structure contains results of all previous visitor classes.

Figure 9:
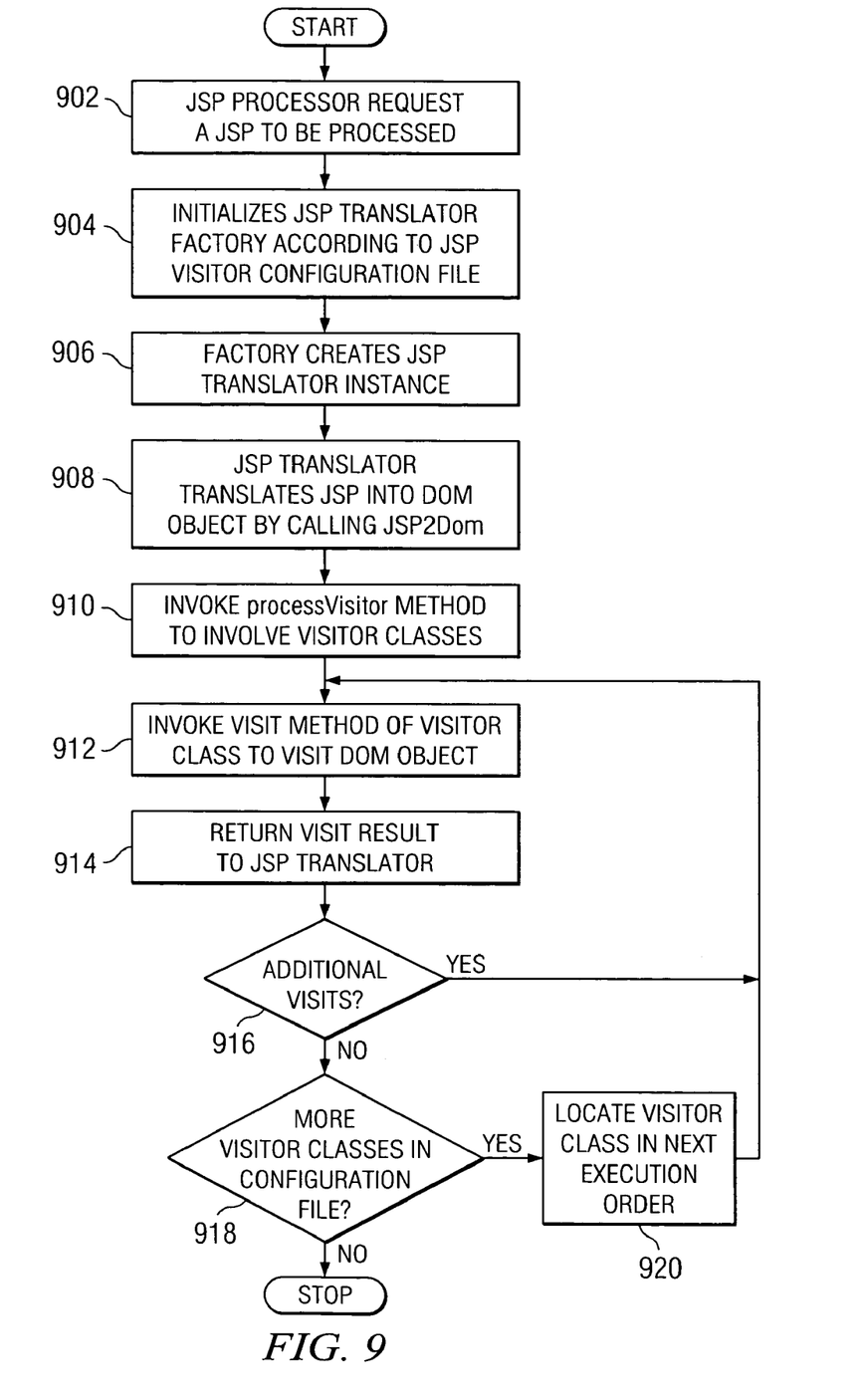
FIG. 9 is a flowchart process of configurable JSP processing framework of the present invention in accordance with a preferred embodiment of the present invention.

Turning next to FIG. 9, a flowchart process of configurable JSP processing framework of the present invention is depicted in accordance with a preferred embodiment of the present invention. As depicted in FIG. 9, from the processing framework's perspective, the process begins when a JSP processor, such as a JSP engine or an integrated development requirement (IDE), requests a JSP page or document to be processed (step 902). Next, the processing framework initializes the JSP translator factory according to "visitor" classes defined in the JSP visitor configuration file (step 904). The JSP translator factory then creates a JSP translator instance (step 906).

The JSP translator then translates the JSP page or document into a DOM object by calling JSP2Dom (step 908). Once the DOM object is created, the JSP translator invokes its processVisitors method to invoke a visitor class (step 910).

The visit method of the visitor class is then invoked to visit the DOM object to gather information about a JSP (step 912). Visit results are returned to the JSP translator once information is gathered (step 914).

Thereafter, determination is made by the JSP translator as to whether additional visits by the visitor class is required (step 916). If additional visits by the visitor class is required, the JSP translator returns to step 912 and invokes the visit method of the current visitor class again to visit the DOM object.

If additional visits by the visitor class is not required, a determination is made by the JSP translator as to whether more visitor classes are defined in the JSP visitor configuration file (step 918). If additional visitor classes are defined in the JSP visitor configuration file, the JSP translator then locates the visitor class in the next execution order according to the JSP visitor configuration file (step 920) and returns to step 912 to invoke the visit method of the next visitor class to visit the DOM object. If additional visitor classes are not defined in the JSP visitor configuration file, the process terminates thereafter.

Using the processing framework of the present invention, a service or tool provider would be relieved of the need to convert a JSP page or document into a DOM object, and to validate that the JSP page or document is syntactically correct, both of which requires additional development effort and knowledge of the JSP specification. For example, in order to perform validation of syntax, the value of each element of the JSP document or page including its tag files are validated against the syntax of the JSP specification.

Figure 10A:
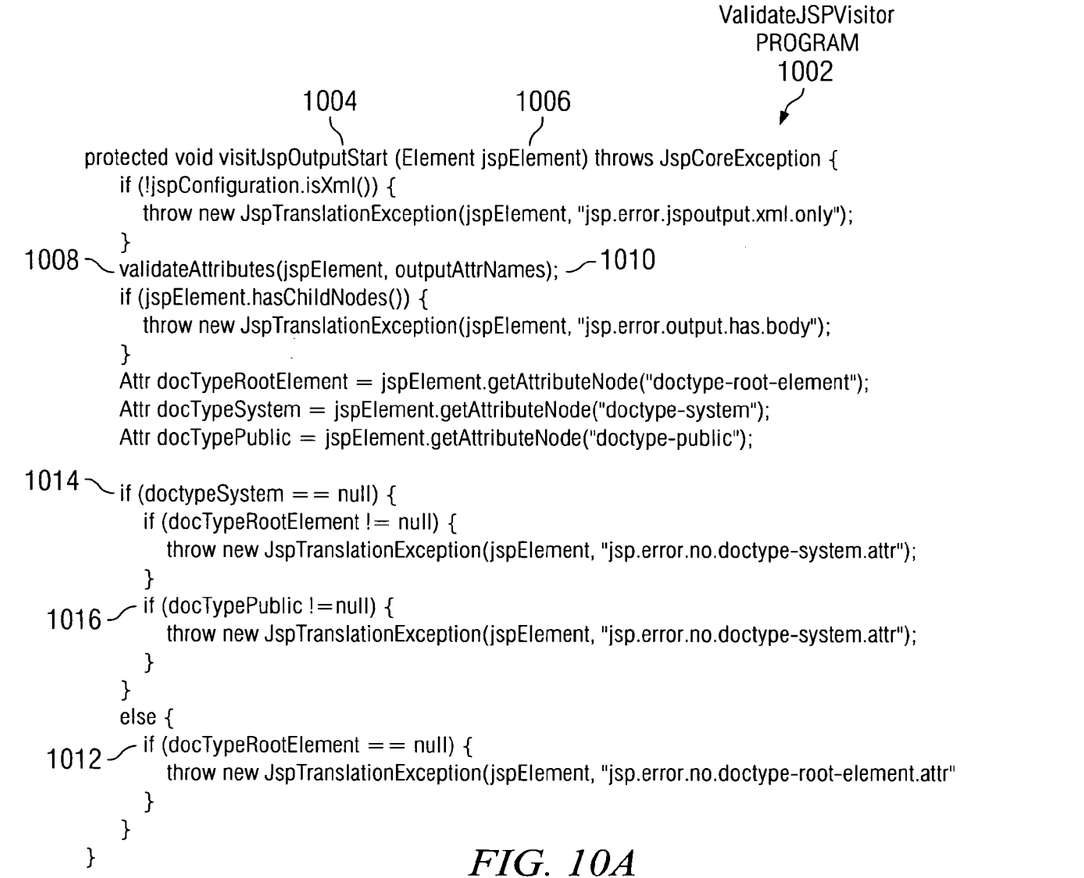
FIG. 10A is a diagram illustrating example validation of JSP in accordance with a preferred embodiment of the present invention.

Turning next to FIG. 10A, a diagram illustrating example validation of JSP is depicted in accordance with a preferred embodiment of the present invention. As depicted in FIG. 10A, ValidateJSPVisitor program 1002 includes a method visitJspOutputStart 1004. VisitJspOutputStart 1004 takes a JSP element 1006 as an input parameter.

Next, attributes of the JSP element 1006 are validated against the syntax of the specification using method validateAttributes 1008, which takes a list of output attribute names from the specification, outputAttrNames 1010, and validates against attributes of JSP element 1006.

After the value of attributes from JSP element 1006 are validated, value of the attribute nodes, such as docTypeRootElement 1012, docTypeSystem 1014 and docTypePublic 1016 are checked to make sure that they are not null, in order to comply with the JSP specification.

Figure 10B:
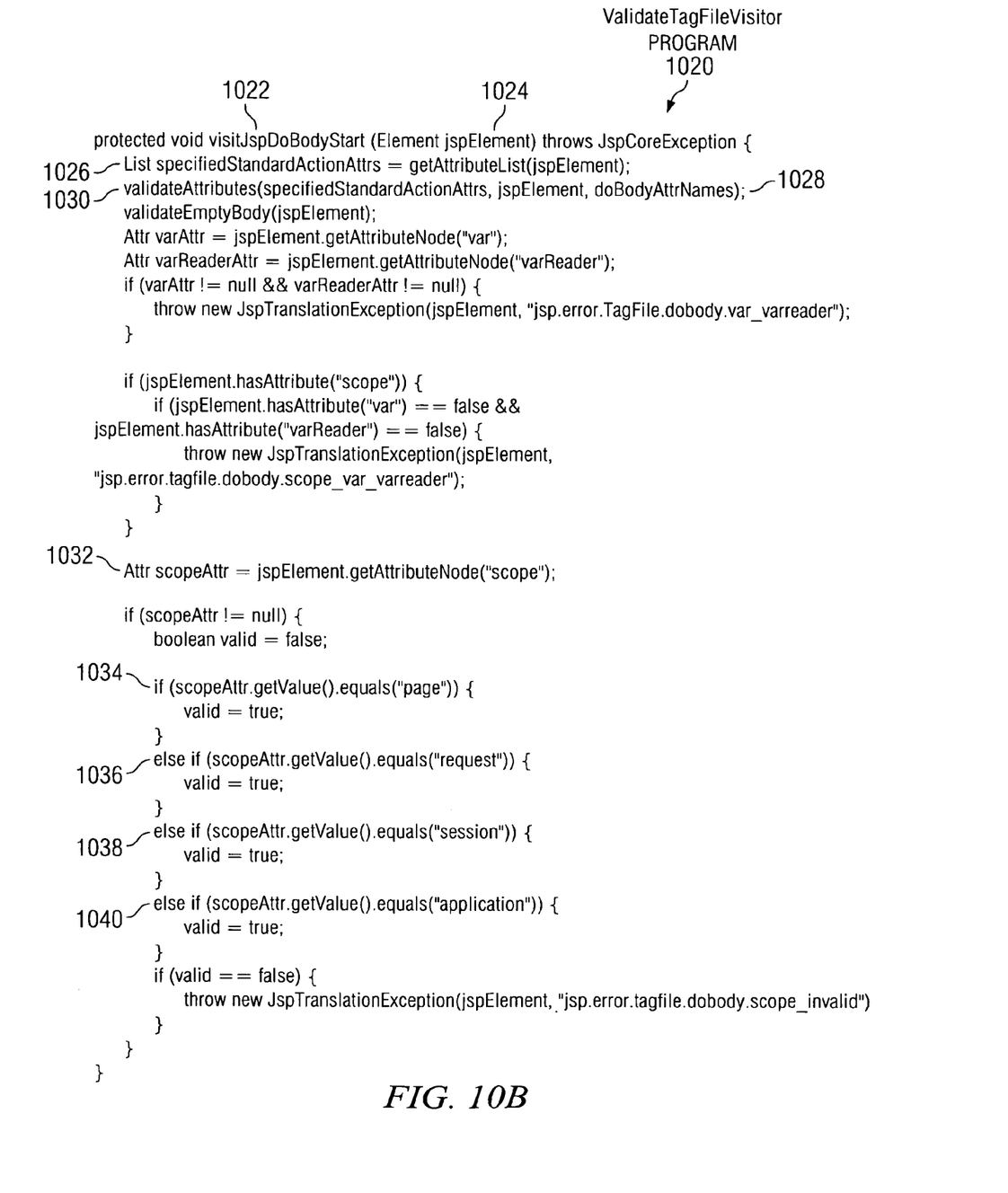
FIG. 10B is a diagram illustrating example validation of a tag file in accordance with a preferred embodiment of the present invention.

Turning next to FIG. 10B, a diagram illustrating example validation of a tag file is depicted in accordance with a preferred embodiment of the present invention. As depicted in FIG. 10B, ValidateTagFileVisitor program 1020 includes a method visitJspDoBodyStart 1022, which takes a JSP element 1024 as an input parameter. First, a list of attributes from the JSP element of a tag file is gathered as specifiedStandardActionAttrs 1026.

Then, specifiedStandardActionAttrs 1026 are validated against doBodyAttrNames 1028, which is a list of attribute names from the specification, using method validateAttributes 1030. Further in program ValidateTagFileVisitor 1020, the scope 1032 of the tag file is validated by checking its value to determine whether it is equal to one of "page" 1034, "request" 1036, "session" 1038 or "application" 1040. These are all valid scope defined in the specification.

In addition to syntax validation, common typical operations, such as collection of included tag files, generation of JAVA source file for a JSP page or document and its tag files, are supported by the processing framework of the present invention.

Figure 11:
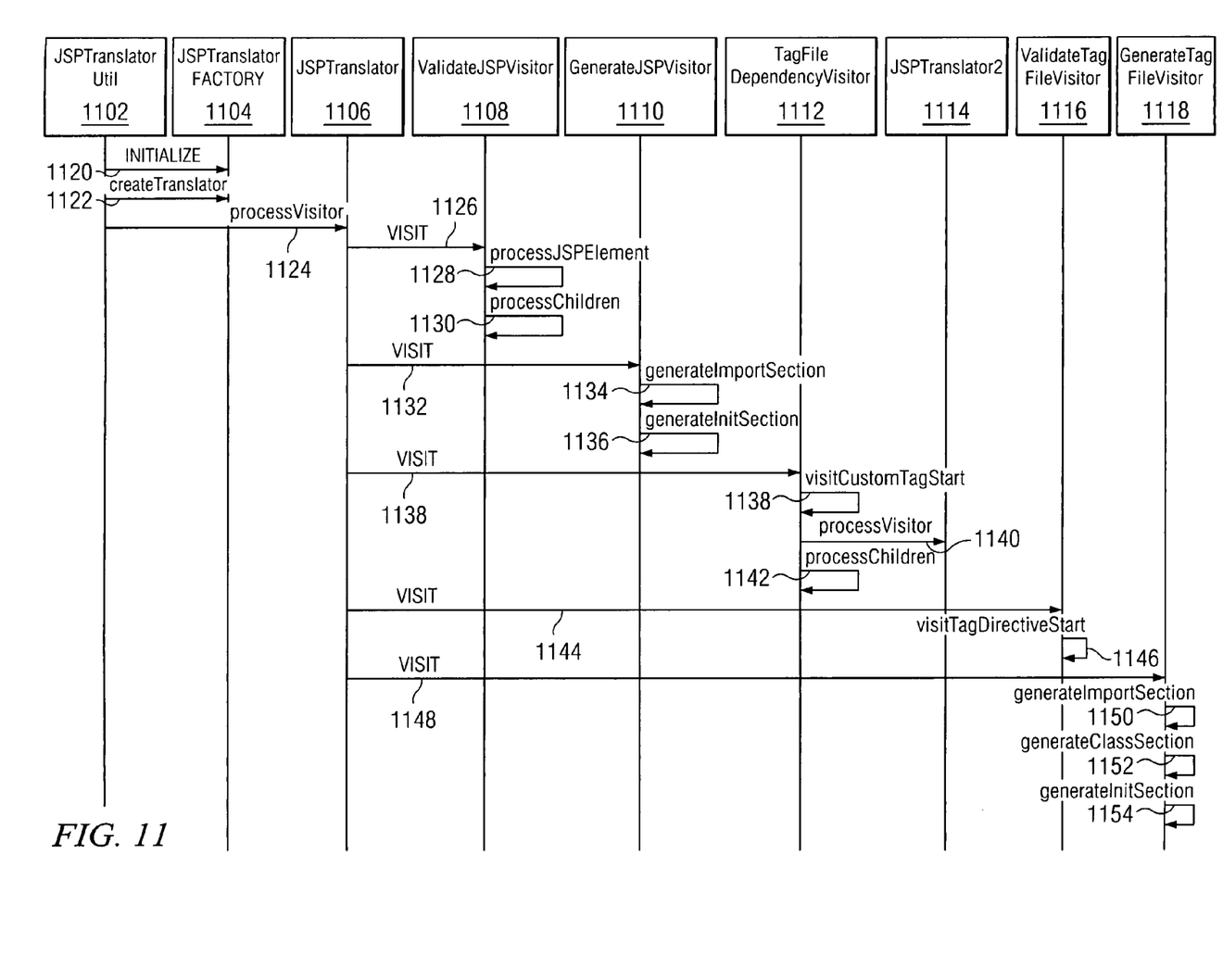
FIG. 11 is a diagram illustrating component interactions for validating a JSP and generating JAVA source file from the JSP in accordance with a preferred embodiment of the present invention.

Turning next to FIG. 11, a diagram illustrating component interactions for validating a JSP and generating JAVA source file from the JSP is depicted in accordance with a preferred embodiment of the present invention. As depicted in FIG. 11, JSPTranslatorUtil 1102 is a class, which initiates the processing of a JSP document or page. JSPTranslatorUtil 1102 initializes the JSPTranslatorFactory 1104 by invoking the initialize method (call 1120) with the path of the JSP visitor configuration file, which defines a collection of "visitor" classes.

Once JSPTranslatorFactory 1104 is initialized, the JSPTranslatorUtil 1102 creates an instance of JSPTranslator 1106 by invoking createTranslator method (call 1122) of JSPTranslatorFactory 1104. Next, JSPTranslatorUtil 1102 invokes the processVisitors method (call 1124) of JSPTranslator 1106 in order to execute the visitor classes. JSPTranslator 1106 invokes the visit method (call 1126) of the visitor class, such as ValidateJSPVisitor 1108, to validate the JSP. ValidateJSPVisitor 1108 in turns invokes method processJSPElement (call 1128) to process JSP elements. If child node exists, processChildren (call 1130) calls processJSPElement 1128 recursively until all child nodes are validated.

Once all the elements and nodes are validated, JSPTranslator 1106 invokes the visit method (call 1132) of the next visitor class according to the JSP visitor configuration file, GenerateJSP Visitor 1110. In the illustrative examples, GenerateJSPVisitor 1110 includes methods that generate seven sections of a JAVA source file for a JSP document or page. The seven sections include import, class, static initializer, init, method init, method, and finally. In this example, two of the seven sections are generated by invoking generateImportSection (call 1134) and generateInitSection (call 1136) methods of generateJSPVisitor 1110.

A JSP document or page may include tag files, which are custom tag files used by the JSP. Since one tag file may include another tag file, the processing framework of the present invention checks and collect the dependencies of tag files for a given JSP. Turning back to FIG. 11, JSPTranslator 1106 invokes the visit method 1138 of TagFileDependencyVisitor 1112 in order to check for dependencies. TagFileDependencyVisitor 1112 executes its visitCustomTagStart method (call 1138) recursively to determine if a tag file is found in the JSP. If a tag file is found, a new JSPTranslator, JSPTranslator2 1114 is created to process the tag file. The cycle continues as long as one tag file depends on another by invoking processVisitors method (call 1140) of JSPTranslator2 1114. Consequently, all dependencies are collected into a dependency list at the top-level JSPTranslator.

After all dependent tag files are collected, the child nodes of the node that started off this sequence are now processed by invoking the processChildren method (call 1142). To complete processing of the JSP, tag files collected are validated by invoking visit method (call 1144) of validateTagFileVisitor 1116. ValidateTagFileVisitor 1116 invokes visitTagDirectiveStart method (call 1146) to validate the tag file. Finally, a JAVA source file for the tag file is generated by invoking visit method (call 1148) of generateTagFileVisitor 1118, which in turn invokes its generateImportSection method (call 1050), generateClassSection method (call 1152), and generateInitSection method (call 1154). These three methods generate three of the seven sections in a JAVA source file.

Thus, the present invention provides a configurable JSP processing framework to process JSP document or page. By allowing the processing framework to be configured through the use of a XML JSP visitor configuration file, custom functions may be performed selectively to gather information about a JSP. Consequently, new and different requirements of JSP processors are satisfied. In addition, by translating a JSP into a DOM object, common requirements that involve knowledge of the specification, such as validation of syntax, may be performed. Hence, the present invention easily adapts to new requirements of JSP processors and evolving specification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a JAVASERVER page, the method comprising:
    translating the JAVASERVER page into a document object model object, the document object model object including a set of nodes;
    configuring a set of visitor classes for invocation in a selected sequence;
    processing the document object model using the set of visitor classes in the selected sequence to perform a desired set of custom functions on the document object model, wherein the processing step includes invoking methods in the set of visitor classes on each node in the set of nodes in the selected sequence; and
    storing results, as processing the document object model object occurs, by selected method in the set of visitor classes, in a hash map, wherein the results in the hash map are used by subsequently invoked methods, wherein the subsequently invoked methods do not convert the results into a second document object model object.

2. The method of claim 1 further comprising:
    validating syntax in the JAVASERVER page.

3. The method of claim 1, wherein the set of visitor classes for invocation in the selected sequence is defined in a configuration file.

4. The method of claim 3, wherein the configuration file is an extensible markup language file.

5. The method of claim 3, wherein the selected sequence is defined in the configuration file.

6. The method of claim 1, wherein the JAVASERVER page is translated into a document object model object using a document object model generator.

7. The method of claim 2, wherein the JAVASERVER page is validated using a JAVASERVER page translator.

8. The method of claim 7, wherein the JAVASERVER page translator invokes a visitor class to validate elements in the document object model object against a syntax for a JAVASERVER page specification.

9. The method of claim 1 wherein results from processing using a first visitor class in the set of visitor classes are passed to a second visitor class in the set of visitor classes.

* * * * *